(12) United States Patent
Munkholm

(10) Patent No.: US 6,625,865 B1
(45) Date of Patent: Sep. 30, 2003

(54) METHOD OF PROCESSING THE CONNECTING SURFACES BETWEEN A MARINE ENGINE FRAME AND THE ASSOCIATED BEARING SUPPORT, AND AN APPARATUS AND USE OF THE METHOD AND APPARATUS

(75) Inventor: Jan Munkholm, Arden (DK)

(73) Assignee: Ciserv Denmark A/S, Arden (DK)

(*) Notice: Subject to any disclaimer, the term of this patent is extended or adjusted under 35 U.S.C. 154(b) by 0 days.

(21) Appl. No.: 09/830,259

(22) PCT Filed: Nov. 10, 1999

(86) PCT No.: PCT/DK99/00615
§ 371 (c)(1),
(2), (4) Date: Jul. 18, 2001

(87) PCT Pub. No.: WO00/27577
PCT Pub. Date: May 18, 2000

(30) Foreign Application Priority Data
Nov. 11, 1998 (DK) .......................................... 1998 01458

(51) Int. Cl.[7] .............................. B23P 9/00; B23Q 3/157
(52) U.S. Cl. ........................ 29/557; 382/152; 382/154; 219/69.15
(58) Field of Search .............................. 82/1.11, 46, 47, 82/147, 149, 173; 29/557; 382/154, 152, 151; 348/94; 700/175, 159, 160, 166; 219/69.11, 69.15

(56) References Cited

U.S. PATENT DOCUMENTS

| 4,985,992 A | * | 1/1991 | Vosgien ........................ 29/558 |
| 5,095,787 A | * | 3/1992 | Leroux et al. ................ 82/1.11 |
| 5,255,199 A | * | 10/1993 | Barkman et al. ............. 348/94 |
| 5,311,784 A | * | 5/1994 | Girard et al. ................. 700/175 |
| 5,768,137 A | * | 6/1998 | Polidoro et al. ............. 382/152 |

FOREIGN PATENT DOCUMENTS

GB      2060460 A     *     5/1981     .............. B23P/1/12

* cited by examiner

Primary Examiner—Henry W. H. Tsai
(74) Attorney, Agent, or Firm—William J. Sapone; Coleman Sudol Sapone, P.C.

(57) ABSTRACT

A method of processing the connecting surfaces between a marine engine frame and an associated bearing support, which parts wholly or partially surround a crankshaft is presented. The bearing support is removed to expose the connecting surface of the engine frame facing towards the bearing support. An auxiliary plane is established which is set-up/extended along the centerline of the crankshaft, and a second line at right-angles to the centerline. In situ processing of the connecting surface of the engine frame is effected at an angle which is a function of the position of the auxiliary plane. It is thus possible to process the connecting surface of the engine frame facing towards the bearing support without the necessity of having to remove the engine frame itself, and to carry out the processing of at least this free connecting surface, while the actual bearing support can be processed in the normal manner.

10 Claims, 2 Drawing Sheets

Figure 1:
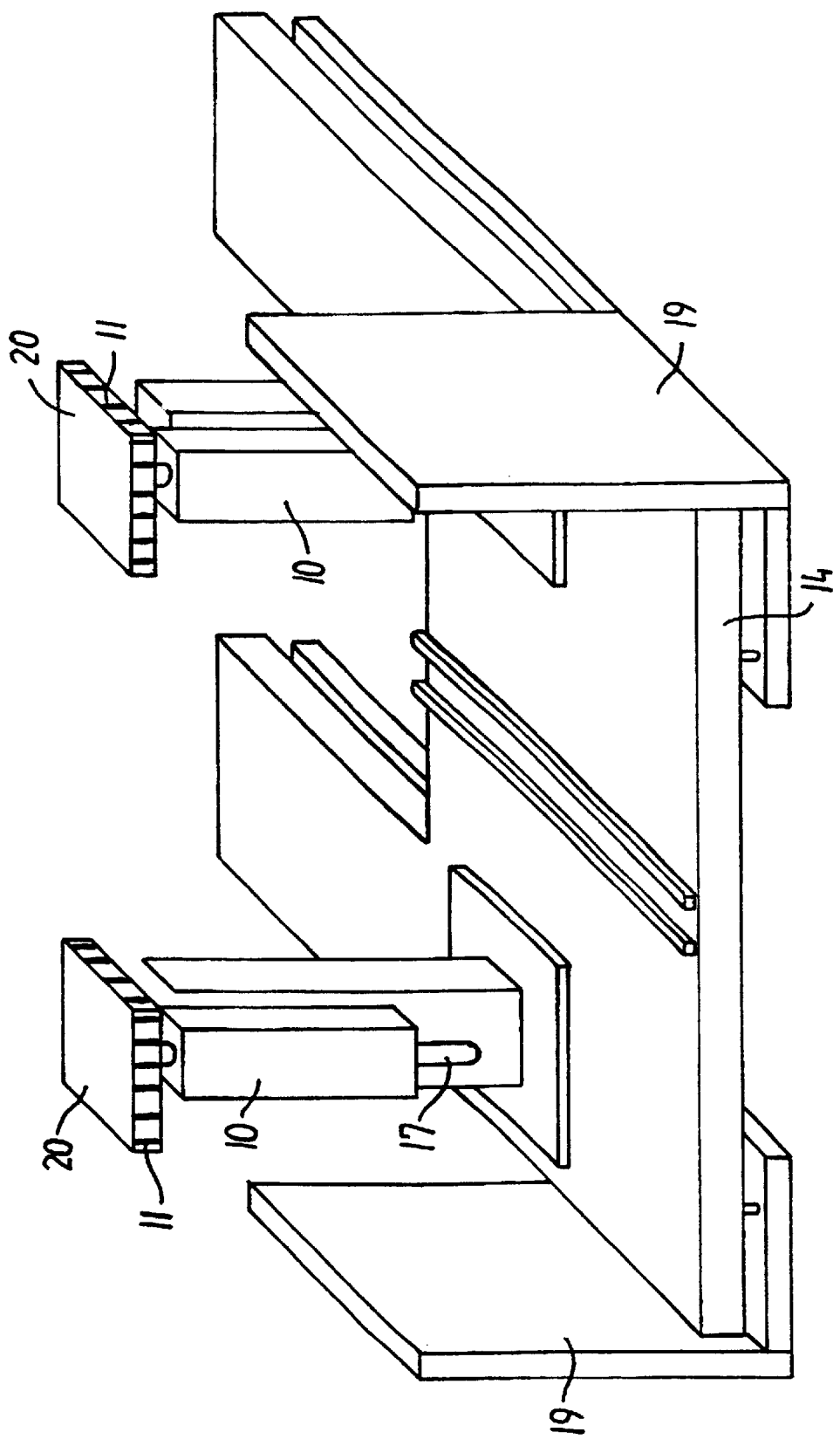

METHOD OF PROCESSING THE CONNECTING SURFACES BETWEEN A MARINE ENGINE FRAME AND THE ASSOCIATED BEARING SUPPORT, AND AN APPARATUS AND USE OF THE METHOD AND APPARATUS

The invention concerns a method of processing the connecting surfaces between a marine engine frame and the associated bearing support, which parts wholly or partially surround a crankshaft, said bearing support being removed to expose the connecting surface of the engine frame and facing towards the bearing support, and also an apparatus/setting-up system for the execution of the method.

During the use of marine engines, a pitting by erosion occurs on the connecting surfaces between the engine frame and the bearing support. The result of this pitting, which occurs in the connecting surface, is that the two parts do not fit together in an optimum manner, so that there is a risk that crankshaft and bearings, which the two parts surround, describe asymmetrical rotations, whereby there is a risk of bearing seizure. In order for a crankshaft to function in an optimum manner, it is thus important that the connecting surfaces between the engine frame and the bearing support are uniform and without play. Therefore, it is important to carry out a processing of these connecting surfaces as soon as this pitting is detected The known technique involves the removal of the bearing support itself and thereafter the removal of the entire engine frame in order that the two opposing connecting surfaces can be processed, preferably by a mechanical method. In that the engine frame weighs up to several hundred tons, such a procedure involves great costs and a great consumption of time. It is desirable, therefore, to be able to develop a method for the processing of these connecting surfaces without the necessity of having to remove the engine frame, and thus effect a processing of at least this free connecting surface, while the bearing support itself can be processed in a normal manner.

This is made possible with a method of the kind disclosed in the preamble, and where there is also established an auxiliary plane which is setup/extended following the centreline of the crankshaft, and a second auxiliary line at right-angles to this line, and that an in situ processing of the connecting surface of the engine frame is effected at an angle which is a function of the position of the auxiliary plane.

It is expedient that the actual establishing of the auxiliary lines can take place as disclosed in DK 167,080.

It is thus important that there is established an auxiliary plane which determines those surfaces which must be processed in a uniform manner in retaliation to the crankshaft, so that no oblique grinding of the surfaces takes place. When this auxiliary plane is registered and coded in, it is subsequently possible to carry out a processing of those surfaces in which pitting has occurred. This processing of the surfaces is preferably effected by means of a spark machining, where in a manner of speaking the spark electrodes work in reverse, in that the electrodes are moved from below and up towards the connecting surface at a given frequency. The liquid which must be used in order for the spark machining to take place is supplied through a hole drilled in the engine frame itself. This hole also serves the mounting of an assembly bolt for the assembly of the engine frame against the bearing support, but can now expediently be used for the feeding through of the liquid. It is important that the liquid flow is such that it seeks to remove the "swarf" which arises during the spark machining, so that the electrode processing can result in an even and smooth surface, and so that sparks are not emitted in the areas where this must not take place.

It is expedient to effect the actual setting-up by means of lasers, in that the laser is set up in accordance with the centerline of the crankshaft, and that subsequent use is made of angle lasers for lateral setting up, in that this angle laser has the centerline of its light parallel with a bore in the engine frame, said bore being substantially at right-angles to the crankshaft. This plane is transferred to the electrodes by means of a reference sensor from the auxiliary plane. The reference sensor is an electronic, two-coordinate gyro with an accuracy of 0.002°. In this way it is ensured that the auxiliary plane, which is necessary for the spark machining to take place at the corrected angle, is positioned correctly.

It is also expedient for the spark machines to be two in number, i.e. one on each side of the crankshaft, and that the spark electrodes are encapsulated in a vessel, in the sense that the actual upper surface of the electrode is naturally not encapsulated, but where the liquid covers this. It is hereby ensured that a flushing away of elements from these surfaces is effected, and where the actual supply of liquid takes place.

The invention also concerns an apparatus/setting-up system for the execution of the method, and where this comprises a base plate on which at least two spark electrode machines are placed, said spark electrode machines being mounted on a vertically-displaceable column, and that the apparatus/setting-up system also comprises means for the positioning of the base plate seating.

Also disclosed is an expedient encapsulation of the spark electrodes in such a manner that it is ensured that there is liquid present during the processing.

Finally, the invention also concerns the use of the method and the apparatus.

Figure 2:
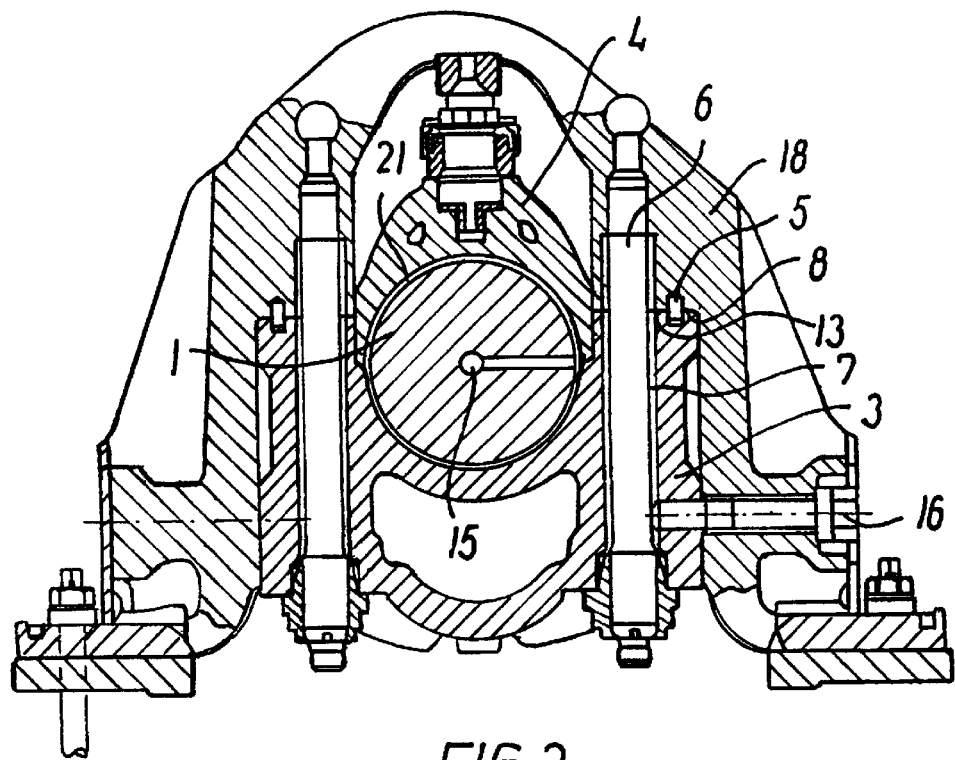
Figure 3:
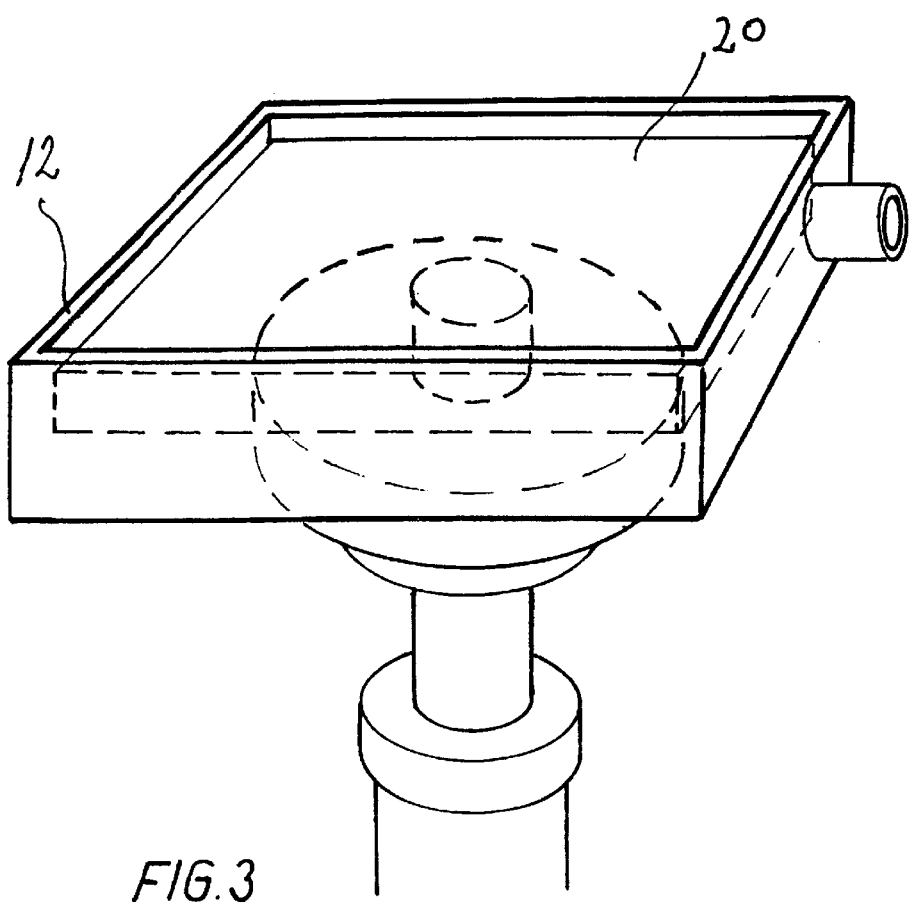

The invention will now be explained in more detail with reference to the drawing, where FIG. 1 shows an apparatus/setting-up system for use in the execution of the method according to the invention, FIG. 2 shows a part section through a marine engine comprising crankshaft, bearing shells, bearing cap and bearing support and engine frame, FIG. 3 shows the electrodes in relation to the surrounding vessel filled with liquid.

In FIG. 2 is seen a marine engine cut through in the area around a bearing 21. The cross-section comprises a crankshaft 1, which is surrounded by bearing shells 21, and where said crankshaft has a well-defined centreline 15. The bearings are surrounded by a bearing housing comprising a bearing cap 4 and a bearing support 3. The whole of the construction is surrounded in turn by an engine frame 18 which is secured to the bearing support 3 via vertically-extending bolts 6 disposed on each side of the crankshaft 1. In order for the bearing cap 4 and the bearing support 3 to be positioned correctly at their connecting surfaces 8, a guide stud 5 for correct assembly is provided in the one connecting surface 8.

At right-angles to the centreline and parallel with the horizontal plane, a bolt construction extends through the engine frame 18 and the bearing support 3 which ensures the correct position between these parts. The centreline of the hole for the bolt 16, together with the centreline for the crankshaft, constitute lines which span an auxiliary plane 14, which will be explained in the following.

When the connecting surface 8 is to be processed to secure that the pitting which arises as a result of erosion can be processed, the bearing support 3 is separated from the engine frame 18 by loosening the bolts 6 on each side of the crankcase. Thereafter, the bearing support 3 is removed leaving the engine frame 18 with associated elements standing with a free surface 13 in which the pitting has occurred. The free surface of the bearing support 3 will similarly display erosion pitting, and this is processed in the normal way.

The free surface 13 of the engine frame 18 will be processed by means of the spark machining set-up, which will be described in the following.

The actual set-up for the processing of the free surface is seen in FIG. 1. The position of the auxiliary plane 14 is set by means of the crankshaft's centreinel 15 and the transverse centreline 16 which spans an auxiliary plane, whereby it is ensured that the free surface will be processed correctly in relation to the crankshaft itself. This is important, because an incorrect angling of the free surface will give rise to an incorrect assembly of the bearing housing, with subsequent risk of bearing seizure. On the auxiliary plane's 14 base plate there are mounted two spark machines 10, which uppermost have a spark electrode 11 which can be displaced vertically in relation to the auxiliary plane 14 by means of displacement elements, e.g. in the form of hydraulic or pneumatic arrangements or an inching motor.

The upper surface 20 of the spark electrode is the active surface from which the spark machining of the free surface takes place. This surface constitutes a negative in relation to the free surface, and is at least just as large as the extent of the free surface in order to ensure a uniform processing. During its work, the spark electrode will thus be moved up and down on its rails at a given frequency, which will depend on the nature of the surface. However, there is a movement of 0.3 mm, and such that the electrode never touches the free surface.

It is important that the connecting surface is flat and uniform in order to ensure that the bearing in the bearing housing does not suffer damage during operation of the engine. Since such an engine frame 18 is very heavy, up to several hundred tons, a great saving of work is hereby made possible in that the engine frame does not have to be removed from the area in order for the processing of the free surface to be effected, and in that it is sufficient exclusively to remove the bearing support 3, the weight of which, all things being equal, is minimal and therefore easier to handle.

FIG. 3 shows the spark electrode in relation to a surrounding vessel 12. This vessel surrounds the spark electrode in such a manner that the active surface of the spark electrode is covered by liquid, and that besides the active surface is naturally left free. Three sides of the vessel will typically consist of rigid walls, while the fourth side will consist of a rubber-like wall which allows a certain displacement during the up an down movements of the spark electrode. The liquid which is supplied to the spark electrode will be supplied continuously through the hole which is left when the bolt 6 in FIG. 2 is removed. Into this hole there is pressed a hose which opens out in a rose with a diameter of approx. 60 mm. The rose is disposed approx. 20–30 mm from where the hole opens out. In this way, a pressure regulation of the liquid flow is achieved with the upwards and downwards movement of the electrodes. A valve in the bottom of the vessel 12 ensures that the liquid flows out again, so that a certain flow takes place. It is necessary to ensure that the "swarf" which is removed during the spark machining operation does not lie on top of the electrodes and thus give rise to uncontrolled sparks and herewith an uneven processing of the free surface on the engine frame. The liquid is re-circulated, but after it has been filtered to ensure that the sludge particles have been removed.

The system is envisaged primarily for use for marine engines, in that due to the great weight it is difficult to get the said surfaces processed. However, the system can also be used in other connections, e.g. aviation engines and engines for heavy vehicles and the like.

What is claimed is:

1. A method for in situ processing of connecting surfaces between a marine engine frame and a bearing support, that together wholly or partially surround a crankshaft comprising:

removing the bearing support to expose the connecting surface of the marine engine frame facing towards the bearing support;

defining an auxiliary plane extending along a center line of the crankshaft using a laser by directing a light beam parallel with a bore in the engine frame lying substantially at a right-angle to the crankshaft, and along the centerline of the crankshaft;

transferring the position of the auxiliary plane to spark machining electrodes;

using an electronic two-coordinate gyro to adjust the auxiliary plane positioning of the spark electrodes for spark machining at a specified angle, as a function of the position of the auxiliary plane; and performing an in-situ spark machining of the connecting surface of the engine frame at the specified angle.

2. The method according to claim 1, wherein one or more spark machines are positioned on the auxiliary plane, with an active surface of the spark electrodes located opposite the connecting surface of the engine frame.

3. The method according to claim 1, further comprising supplying a vessel that partially surrounds at least one spark electrode except for the active surface thereof, the vessel containing a liquid, the at least one spark electrode being surrounded by the liquid.

4. The method according to claim 3, wherein an upper surface of the liquid covers the active surface of the at least one spark electrode.

5. The method according to claim 4, wherein the vessel is a liquid-tight container which surrounds five surfaces of the at least one spark electrode.

6. The method according to claim 3, further comprising supplying the liquid to the vessel through a hole in the engine frame lying above the active surface during spark machining.

7. The method according to claim 1, further comprising providing a base plate on which at least two spark electrode machines are placed, mounting said spark electrode machines on a vertically-diplaceable column seated on said base plate, and providing means for positioning the base plate relative to the auxiliary plane.

8. An apparatus for in situ processing of the connecting surfaces between a marine engine frame and a bearing support that together wholly or partially surround a crankshaft comprising:

means for directing a light beam parallel with a bore in the engine frame lying substantially at a right angle to the crankshaft and along a centerline of the crankshaft, to define a position of an auxiliary plane;

spark machining electrodes positionable for processing the connecting surface of the engine frame; and electronic two coordinate gyro means for positioning the spark machining electrodes along the auxiliary plane at a specified angle which is a function of the position of the auxiliary plane.

9. The apparatus of claim 8 further comprising a vessel for partially surrounding at least one spark electrode for containing a liquid that covers the at least one spark electrode.

10. The apparatus of claim 8 further comprising a base plate, at least two spark electrode machines mounted on the base plate and being vertically displaceable thereon and, means for positioning the base plate relative to the auxiliary plane.

* * * * *